United States Patent
Yen (10) Patent No.: US 11,431,183 B2
(45) Date of Patent: Aug. 30, 2022

(54) SMART BATTERY DEVICE

(71) Applicant: Quanta Computer Inc., Taoyuan (TW)

(72) Inventor: Wei-Ting Yen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 261 days.

(21) Appl. No.: 17/000,787

(22) Filed: Aug. 24, 2020

(65) Prior Publication Data
US 2021/0376638 A1   Dec. 2, 2021

(30) Foreign Application Priority Data

May 28, 2020   (TW) .................. 109117760

(51) Int. Cl.
  *H02J 7/00*      (2006.01)
  *H01M 10/42*     (2006.01)
  *H01M 10/44*     (2006.01)
  *H01M 10/48*     (2006.01)

(52) U.S. Cl.
  CPC ....... *H02J 7/0049* (2020.01); *H01M 10/4257* (2013.01); *H01M 10/443* (2013.01); *H01M 10/486* (2013.01); *H02J 7/00714* (2020.01); *H02J 7/007182* (2020.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 2004/0247994 | A1* | 12/2004 | Masuda | H02J 7/00714 429/157 |
| 2007/0082265 | A1* | 4/2007 | Itou | H01M 4/131 429/231.1 |
| 2009/0325058 | A1* | 12/2009 | Katayama | H01M 50/431 429/142 |
| 2012/0256569 | A1* | 10/2012 | Kawahara | H01M 10/63 374/142 |
| 2016/0116548 | A1 | 4/2016 | Ghantous et al. | |
| 2019/0198938 | A1 | 6/2019 | Fujita et al. | |

OTHER PUBLICATIONS

Extended European Search Report dated Mar. 19, 2021, issued in application No. EP 20202600.1.

* cited by examiner

*Primary Examiner* — Arun C Williams
(74) *Attorney, Agent, or Firm* — McClure, Qualey & Rodack, LLP (57) ABSTRACT

The battery device includes an energy storage unit, a temperature sensing unit, a storage unit, and a processing unit. The processing unit calculates the internal resistance of the energy storage unit to obtain a first increment corresponding to the internal resistance, and detects the charging voltage that is charging the battery device to obtain a second increment that corresponds to the charging voltage. The processing unit detects the discharging current of the energy storage unit to obtain a third increment corresponding to the discharging current. The processing unit further reads the cycle count from the storage unit to obtain a fourth increment that corresponds to the cycle count, reads the temperature from the temperature sensing unit to obtain a fifth increment that corresponds to the temperature, and determines the swelling rate of the battery device according to the product value of the first, second, third, fourth, and fifth increments.

10 Claims, 3 Drawing Sheets

SMART BATTERY DEVICE

CROSS REFERENCE TO RELATED APPLICATIONS

This application claims priority to and the benefit of Taiwan Application No. 109117760, filed on May 28, 2020, the entirety of which is incorporated by reference herein.

FIELD OF THE INVENTION

The invention relates to a battery device, especially one relating to a method for detecting the swelling rate of the battery device through the charge-discharge process of the battery device.

DESCRIPTION OF THE RELATED ART

In today's booming era of mobile communications, a battery (usually a lithium battery) has become one of the most critical components of a mobile device. As the size of mobile devices is becoming smaller and smaller, the available space in a mobile device that can accommodate the battery becomes more and more limited. With the accumulation of a (charge-discharge) cycle count of the lithium battery in the mobile device, the possibility of battery swelling is higher and higher, and the degree of swelling may also be greater and greater.

In the space where the lithium battery is placed in the mobile device, the industry usually reserves 10% space of the thickness of the lithium battery to prevent the lithium battery from squeezing the mobile device cases caused by the swelling of the lithium battery. However, in existing mobile devices, the swelling degree of the lithium battery cannot be monitored. When the swelling rate of the lithium battery reaches 10%, the lithium battery may squeeze the mobile device cases, causing the cases to deform, and even causing a short circuit of the battery cell in the lithium battery, resulting in the possibility of explosion.

BRIEF SUMMARY OF THE INVENTION

In order to resolve the issue described above, an embodiment of the invention provides a battery device, comprising: an energy storage unit, a temperature sensing unit, a storage unit, and a processing unit. The energy storage unit stores electrical energy. The temperature sensing unit detects the temperature of the battery device. The storage unit stores the cycle count of the battery device. The processing unit is coupled to the energy storage unit, the temperature sensing unit, and the storage unit. While in charging mode, the processing unit calculates the internal resistance of the energy storage unit, to obtain a first increment corresponding to the internal resistance according to the internal resistance, and stores the first increment in the storage unit. The processing unit detects a charging voltage that charges the battery device, obtains a second increment corresponding to the charging voltage according to the charging voltage, and stores the second increment in the storage unit. While in discharging mode, the processing unit detects the discharging current of the energy storage unit, obtains a third increment corresponding to the discharging current, and stores the third increment in the storage unit. While in either the charging mode or the discharging mode, the processing unit reads the cycle count in the storage unit and obtains a fourth increment corresponding to the cycle count. The processing unit reads the temperature from the temperature sensing unit, obtains a fifth increment corresponding to the temperature, and stores the fifth increment in the storage unit. In a charge-discharge cycle, the processing unit reads the first, second, third, fourth, and fifth increments from the storage unit, and determines the swelling rate of the battery device according to a product value of the first, second, third, fourth, and fifth increments.

According to the battery device disclosed above, in the charging mode, the processing unit reads the first, second, fourth, and fifth increments from the storage unit, and determines the swelling rate of the battery device according to a first sub-product value of the first, second, fourth, and fifth increments.

According to the battery device disclosed above, in the discharging mode, the processing unit reads the third, the fourth, and the fifth increments from the storage unit, and determines the swelling rate of the battery device according to a second sub-product value of the third, the fourth, and the fifth increments.

According to the battery device disclosed above, further comprising a sensing resistor coupled between the energy storage unit and the processing unit; wherein the processing unit calculates a charging current in the charging mode or calculates the discharging current in the discharging mode by measuring the voltage across the sensing resistor.

According to the battery device disclosed above, the processing unit calculates the internal resistance of the energy storage unit comprises: measuring a first voltage of the energy storage unit at a first time point; measuring a second voltage of the energy storage unit at a second time point; and calculating the internal resistance of the energy storage unit according to the voltage difference between the first voltage and the second voltage and the charging current in the charging mode.

According to the battery device disclosed above, the higher the internal resistance of the energy storage unit is, the larger the first increment is; the higher the charging voltage that charges the battery device is, the larger the second increment is; the larger the discharging current of the battery device is, the larger the third increment is; the more the cycle count of the battery device is, the larger the fourth increment is; and the higher the temperature of the battery device is, the larger the fifth increment is.

According to the battery device disclosed above, in the charging mode, the processing unit detects whether the battery device is coupled to an external power. If yes, executing operations are executed in the charging mode. If not, the battery device enters the discharging mode.

According to the battery device disclosed above, in the discharging mode, the processing unit detects whether there is a discharging current from the energy storage unit. If yes, an executing operation is executed in the discharging mode. If not, the batter device enters into the charging mode.

According to the battery device disclosed above, the processing unit executes the following tasks: obtaining a first product value in a first charge-discharge cycle; obtaining a second product value in a second charge-discharge cycle; storing the first product value in the storage unit when the first product value is larger than the second product value; and storing the second product value in the storage unit when the second product value is larger than the first product value.

According to the battery device disclosed above, the processing unit executes the following tasks: ending the charging mode when the relative state-of-charge of the battery device is 100%, and ending the discharging mode when the relative state-of-charge of the battery device is lower than 3%.

BRIEF DESCRIPTION OF THE DRAWINGS

The invention can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration.

DETAILED DESCRIPTION OF THE INVENTION

Figure 1:
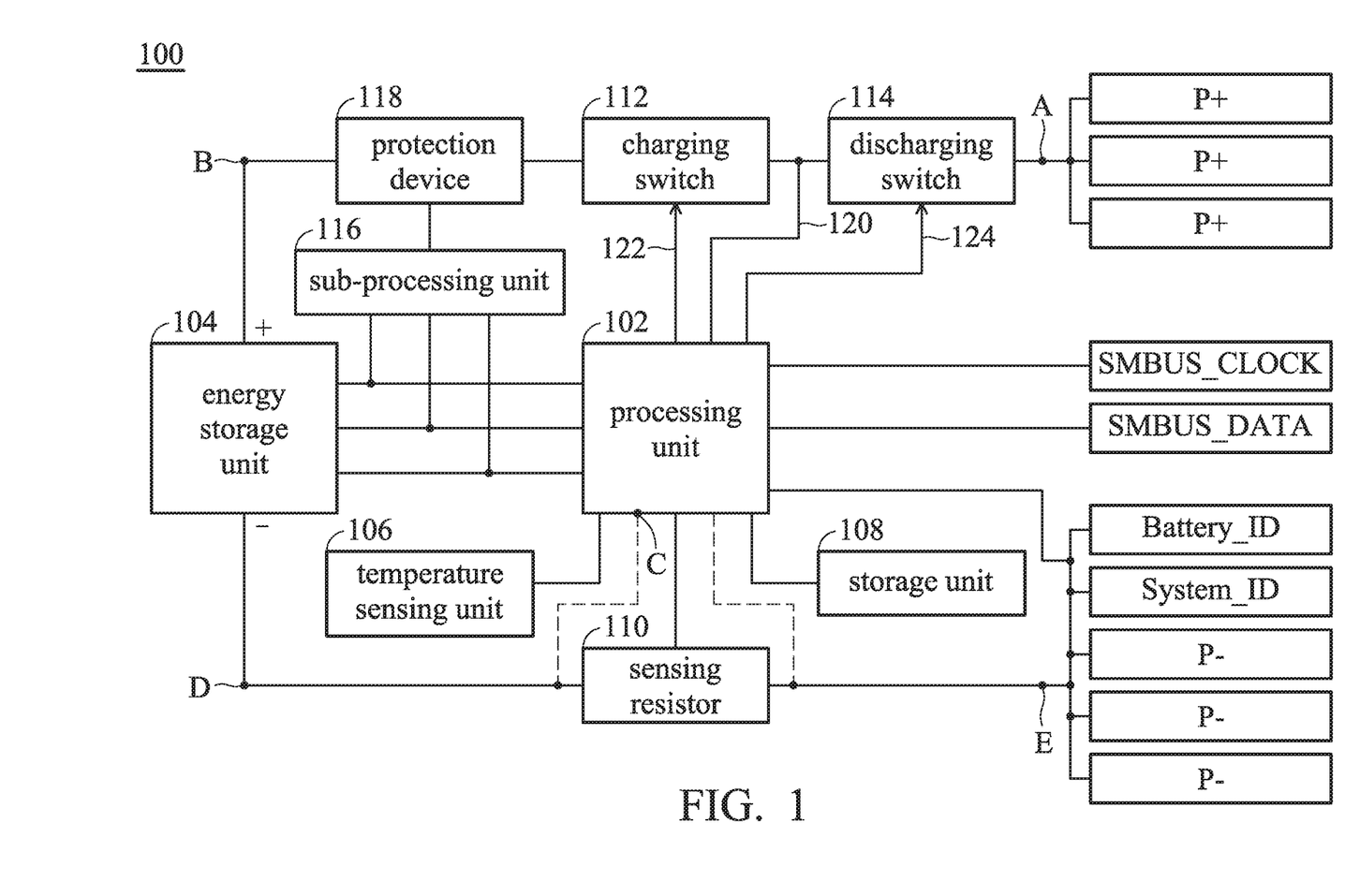
FIG. 1 shows a block diagram of a battery device in accordance with some embodiments of the disclosure.

FIG. 1 shows a block diagram of a battery device in accordance with some embodiments of the disclosure. As shown in FIG. 1, a battery device 100 includes a processing unit 102, an energy storage unit 104, a temperature sensing unit 106, a storage unit 108, a sensing resistor 110, a charging switch 112, a discharging switch 114, a sub-processing unit 116, a protection device 118, a positive power source p+, a negative power source p−, a communication bus SMBUS_CLOCK, SMBUS_DATA, a battery identification indicator BATTERY_ID, SYSTEM_ID, and nodes A, B, C, D, E. In some embodiments, the energy storage unit 104 stores electrical energy. In some embodiments, the energy storage unit 104 has at least one battery cell, which is used to convert the received electrical energy into chemical energy for storage or convert the stored chemical energy into electrical energy for output. The temperature sensing unit 106 detects the temperature of the battery device 100. In some embodiments, the temperature sensing unit 106 is a temperature sensor or a temperature sensing chip. In some embodiments, the temperature sensing unit 106 includes a thermistor whose resistance changes with temperature. The temperature sensing unit 106 provides power to the thermistor, and by measuring the voltage across the thermistor, the change of the voltage across the thermistor is converted into a change in temperature.

The storage unit 108 stores data of a cycle count (or a charge-discharge cycle) of the battery device. In some embodiments, the storage unit 108 is a non-volatile memory, and the data stored therein are not lost when the power is off. In some embodiments, the sub-processing unit 116 is a backup processor of the processing unit 102. When the processing unit 102 cannot operate, the sub-processing unit 116 executes what the processing unit 102 operates. In some embodiments, the protection device 118 is used to automatically cut off the connection between the nodes A and B when a there is a large current between the nodes A and B to protect the energy storage unit 104. The charging switch 112 changes its state according to a control signal sent by the processing unit 102 through a control line 122. For example, when the control signal of the control line 122 is "0", the charging switch 112 only allows a current to flow from the node B to the node A, but prohibits a current from flowing from the node A to the node B. When the control signal of the control line 122 is "1", the charging switch 112 is fully on. In some embodiments, the discharging switch 114 changes its state according to a control signal sent by the processing unit 102 through a control line 124. For example, when the control signal of the control line 124 is "0", the discharging switch 114 only allows a current to flow from the node A to the node B, but prohibits a current from flowing from the node B to the node A. When the control signal of the control line 124 is "1", the discharging switch 114 is fully on.

In some embodiments, the positive power source p+ and the negative power source p− of the battery device 100 provide power to a mobile device where the battery device 100 is installed. In some embodiments, the processing unit 102 of the battery device 100 communicates with a processor of the mobile device through the communication bus SMBUS_CLOCK, SMBUS_DATA. In some embodiments, the processor of the mobile device detects that the battery device 100 has been set in the mobile device by the battery identification indicator BATTERY_ID, SYSTEM_ID of the battery device 100.

The processing unit 102 is coupled to the energy storage unit 104, the temperature sensing unit 106, and the storage unit 108. When the battery device 100 is in the charging mode, the processing unit 102 calculates the internal resistance of the energy storage unit, obtains a first increment corresponding to the internal resistance according to the internal resistance, and stores the first increment in the storage unit 108. Examples are shown in Table 1 below.

TABLE 1

| internal resistance (mOhm) | first increment |
| --- | --- |
| 83.33 | 1 |
| 121.67 | 2 |
| 129.67 | 4 |
| 139.00 | 6 |
| 152.33 | 8 |
| 160.67 | 10 |

When the internal resistance is higher than 83.33 mOhm, but less than or equal to 121.67 mOhm, the processing unit 102 obtains a first increment of 1. When the internal resistance is higher than 121.67 mOhm, but less than or equal to 129.67 mOhm, the processing unit 102 obtains a first increment of 2. When the internal resistance is higher than 129.67 mOhm, but less than or equal to 139.00 mOhm, the processing unit 102 obtains a first increment of 4. When the internal resistance is higher than 139.00 mOhm, but less than or equal to 152.33 mOhm, the processing unit 102 obtains a first increment of 6. When the internal resistance is higher than 152.33 mOhm, but less than or equal to 160.67 mOhm, the processing unit 102 obtains a first increment of 8. When the internal resistance is higher than 160.67 mOhm, the processing unit 102 obtains a first increment of 10. In other words, the higher the internal resistance of the energy storage unit 104 is, the larger the first increment that processing unit 102 obtains is.

In some embodiments, the internal resistance of the energy storage unit 104 measured by the processing unit 102 is a direct current internal resistance (DCIR). In some embodiments, the processing unit 102 measures a first voltage of the energy storage unit 104 at a first time point, and measures a second voltage of the energy storage unit 104 at a second time point. The processing unit 102 calculates the charging current in the charging mode by measuring the voltage across the sensing resistor 110. The processing unit 102 calculates the internal resistance of the energy storage unit 104 according to the voltage difference between the first voltage and the second voltage and the charging current in the charging mode. The time interval between the first time point and the second time point may be, for example, 10 seconds. The charging current in the charging mode is the current at a charging rate of 0.1 C, but the present disclosure is not limited thereto. The processing unit 102 divides the voltage difference between the first voltage and the second voltage by the charging current in the charging mode to obtain the internal resistance of the energy storage unit 104. In some embodiments, the processing unit 102 stores the first increment in an internal resistance register in the storage unit 108.

Figure 2:
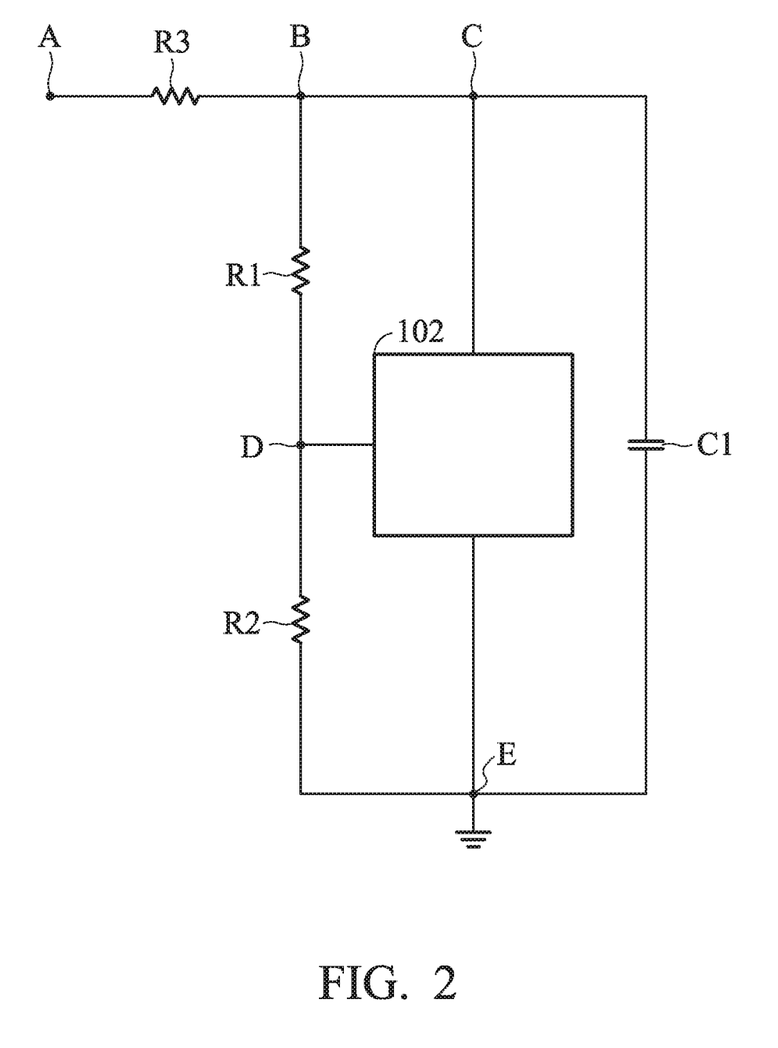
FIG. 2 shows an equivalent schematic diagram of the battery device in FIG. 1 for measuring an internal resistance of an energy storage unit in accordance with some embodiments of the disclosure.

FIG. 2 shows an equivalent schematic diagram of the battery device in FIG. 1 for measuring an internal resistance of an energy storage unit in accordance with some embodiments of the disclosure. As shown in FIG. 2, nodes A, B, C, D, and E in FIG. 2 may correspond to the nodes A, B, C, D, and E in FIG. 1. Therefore, a resistor R1 (between the nodes B and D) is equivalent to the internal resistance of the energy storage unit 104 in FIG. 1. A resistor R2 (between the nodes D and E) is equivalent to the resistance of the sensing resistor 110 in FIG. 1. A resistor R3 (between the nodes A and B) is equivalent to a serial resistance of the charging switch 112, the discharging switch 114, and the protection device 118 in FIG. 1. A capacitor C1 (between the nodes C and E) is equivalent a parasitic capacitor between the processing unit 102 and the negative power source p−. The node C is an inner-node in the processing unit 102. The node B may also connect to the processing unit 102 (not shown in FIG. 1) for voltage detection, thus actually the nodes B and C seem to be in common (as shown in FIG. 2). The processing unit 102 measures a voltage ($V_D$) on the node D, and calculates a voltage ($V_C$) on the node C (that is, the voltage on the node D) by the following formula.

$$V_C = \left(1 + \frac{R1}{R2}\right) V_D$$

After that, the processing unit 102 calculates the resistance of the resistor R1 according to the voltage on the node C and the charging current in the charging mode, that is, the internal resistance of the energy storage unit 104. In some embodiments, the resistance of the charging switch 112 is 4.5 mOhm, the resistance of the discharging switch 114 is 4.5 mOhm, and the resistance of the protection device 118 is 1 mOhm, thus the resistor R2 is 10 mOhm. In some embodiments, the sensing resistor 110 is 10 mOhm. In some embodiments, the processing unit 102 includes at least one comparator to measure the voltage ($V_D$) on the node D. That is, the processing unit 102 measures the voltage ($V_D$) on the node D through the at least one comparator which is omitted as a dotted line connecting to the node D in FIG. 1. In some embodiments, the voltage ($V_D$) on the node D is 1.25V, which is a built-in reference voltage provided by the processing unit 102.

In some embodiments, the present disclosure collects the internal resistance test data of a plurality of (for example, tens of thousands of) battery devices which are the same as the energy storage unit 104 of the battery device 100 in FIG. 1, and stores the internal resistance test data in a database. Through a big data analysis (for example, artificial intelligence (AI) analysis), the relationship between the internal resistance of the energy storage unit 104 and the swelling rate of the battery device 100 is obtained. For example, in the present disclosure, after the internal resistance test of the plurality of the batter devices which are the same as the energy storage units 104 of the battery device 100 is completed, the actual swelling rate of the plurality of the battery devices which are the same as the battery device 100 can be directly measured, correspondingly, and according to the internal resistance test data, the actual swelling rate, and quantity of the plurality of the battery devices which are the same as the battery device 100, the specification shown in Table 1 are determined through the big data analysis.

Then, in the charging mode, the processing unit 102 detects a charging voltage that charges the battery device 100, obtains a second increment corresponding to the charging voltage according to the charging voltage, and stores the second increment in the storage unit 108. Examples are shown in Table 2 below.

TABLE 2

| charging voltage (V) | second increment |
| --- | --- |
| 4.20 | 1 |
| 4.25 | 2 |
| 4.30 | 4 |
| 4.35 | 8 |
| 4.40 | 16 |

When the charging voltage is 4.20 V, the processing unit 102 obtains the second increment as 1. When the charging voltage is 4.25 V, the processing unit 102 obtains the second increment as 2. When the charging voltage is 4.30 V, the processing unit 102 obtains the second increment as 4. When the charging voltage is 4.35 V, the processing unit 102 obtains the second increment as 8. When the charging voltage is 4.40 V, the processing unit 102 obtains the second increment as 16. In some embodiments, as shown in FIG. 1, the processing unit 102 turns on or turns off the charging switch 112 through the control line 122, turns on or turns off the discharging switch 114 through the control line 124, and detects the charging voltage through a line 120. For example, when an external power source is coupled to the battery device 100, the voltage on the node A is an external voltage ($V_{EXT}$). The processing unit 102 outputs a control signal (for example, signal "0") to the discharging switch 114 through a control line 124 to turn off the discharging switch 114, so that the discharging switch 114 only allows a current to flow from the node A to the node B, but prohibits a current from flowing from the node B to the node A. Therefore, the processing unit 102 measures the voltage on the node A through the line 120, that is, the external voltage ($V_{EXT}$) can be measured at the node A, and that is, the charging voltage in Table 2. In other words, the higher the charging voltage (for example, the external voltage ($V_{EXT}$)) that charges the battery device 100 is, the larger the second increment that the processing unit 102 obtains is. In some embodiments, the processing unit 102 stores the second increment in a charging voltage register in the storage unit 108. In some embodiments, the processing unit 102 detects whether the battery device 100 is coupled to an external power source. If yes, the processing unit 102 executes operation executed in the charging mode. If no, the processing unit 102 enters into the discharging mode.

In some embodiments, the present disclosure collects the charging voltage test data of a plurality of battery devices which are the same as the battery device 100, and stores the charging voltage test data in a database. Through a big data analysis, the relationship between the charging voltage and the swelling rate of the battery device 100 is obtained. For example, in the present disclosure, after the charging voltage test of the plurality of the batter devices which are the same as the battery device 100 is completed, the actual swelling rate of the plurality of the battery devices which are the same as the battery device 100 can be directly measured, correspondingly, and according to the charging voltage test data, the actual swelling rate, and quantity of the plurality of the battery devices which are the same as the battery device 100, the specification shown in Table 2 are determined through the big data analysis.

Then, in the charging mode, the processing unit 102 reads data of a cycle count in the storage unit 108, and obtains a fourth increment corresponding to the cycle count according to the cycle count. Examples are shown in Table 3 below.

TABLE 3

| cycle count | fourth increment |
|---|---|
| 0~10 | 1 |
| 10~100 | 2 |
| 100~200 | 4 |
| 200~300 | 8 |
| 300~400 | 16 |
| 400~500 | 32 |
| 500~600 | 64 |
| 600~700 | 128 |
| 700~800 | 256 |
| >800 | 512 |

When the cycle count is 0~10, the processing unit 102 obtains the fourth increment as 1. When the cycle count is 10~100, the processing unit 102 obtains the fourth increment as 2. When the cycle count is 100~200, the processing unit 102 obtains the fourth increment as 4. When the cycle count is 200~300, the processing unit 102 obtains the fourth increment as 8. When the cycle count is 300~400, the processing unit 102 obtains the fourth increment as 16. When the cycle count is 400~500, the processing unit 102 obtains the fourth increment as 32. When the cycle count is 500~600, the processing unit 102 obtains the fourth increment as 64. When the cycle count is 600~700, the processing unit 102 obtains the fourth increment as 128. When the cycle count is 700~800, the processing unit 102 obtains the fourth increment as 256. When the cycle count is larger than 800, the processing unit 102 obtains the fourth increment as 512. In other words, the more the cycle count of the battery device 100 is, the larger the fourth increment is. In some embodiments, whenever the battery device 100 completes a full charge-discharge process, for example, the relative state-of-charge of the battery device 100 is charged from 0% to 100% and then discharged from 100% to 0%, or is charged from 50% to 100%, discharged from 100% to 0%, and then charged from 0% to 50%, the processing unit 102 adds 1 count to the cycle count stored in the storage unit 108. In other words, the cycle count of the battery device 100 is irreversible, which will only increase cumulatively as the charging and discharging cycles increase. In some embodiments, the processing unit 102 stores the data of the cycle count in a cycle count register in the storage unit 108.

In some embodiments, the present disclosure collects the cycle count test data of a plurality of battery devices which are the same as the battery device 100, and stores the cycle count test data in a database. Through a big data analysis, the relationship between the cycle count and the swelling rate of the battery device 100 is obtained. For example, in the present disclosure, after the cycle count test of the plurality of the batter devices which are the same as the battery device 100 is completed, the actual swelling rate of the plurality of the battery devices which are the same as the battery device 100 can be directly measured, correspondingly, and according to the cycle count test data, the actual swelling rate, and quantity of the plurality of the battery devices which are the same as the battery device 100, the specification shown in Table 3 are determined through the big data analysis.

Then, in the charging mode, the processing unit 102 reads a temperature from the temperature sensing unit 106, obtains a fifth increment corresponding to the temperature according to the temperature, and stores the fifth increment in the storage unit 108. Examples are shown in Table 4 below.

TABLE 4

| temperature | fifth increment |
|---|---|
| <=0° C. | 1 |
| 0° C.~20° C. | 2 |
| 20° C.~30° C. | 3 |
| 30° C.~40° C. | 4 |
| 40° C.~50° C. | 5 |
| 50° C.~60° C. | 6 |
| >=60° C. | 7 |

When the temperature is less than or equal to 0° C., the processing unit 102 obtains the fifth increment as 1. When the temperature is between 0° C.~20° C., the processing unit 102 obtains the fifth increment as 2. When the temperature is between 20° C.~30° C., the processing unit 102 obtains the fifth increment as 3. When the temperature is between 30° C.~40° C., the processing unit 102 obtains the fifth increment as 4. When the temperature is between 40° C.~50° C., the processing unit 102 obtains the fifth increment as 5. When the temperature is between 50° C.~60° C., the processing unit 102 obtains the fifth increment as 6. When the temperature is more than or equal to 60° C., the processing unit 102 obtains the fifth increment as 7. In other words, the higher the temperature of the battery device is, the larger the fifth increment is. In some embodiments, the processing unit 102 stores the fifth increment in a temperature register in the storage unit 108. When the relative state-of-charge of the battery device 100 is charged to 100%, the processing unit 102 ends the charging mode, and prepares to enter the discharging node.

In some embodiments, the present disclosure collects the temperature test data of a plurality of battery devices which are the same as the battery device 100, and stores the temperature test data in a database. Through a big data analysis, the relationship between the temperature and the swelling rate of the battery device 100 is obtained. For example, in the present disclosure, after the temperature test of the plurality of the batter devices which are the same as the battery device 100 is completed, the actual swelling rate of the plurality of the battery devices which are the same as the battery device 100 can be directly measured, correspondingly, and according to the temperature test data, the actual swelling rate, and quantity of the plurality of the battery devices which are the same as the battery device 100, the specification shown in Table 4 are determined through the big data analysis.

In the discharging mode, the processing unit 102 detects a discharging current of the energy storage unit 104, obtains a third increment corresponding to the discharging current according to the discharging current, and stores the third increment in the storage unit 108. Examples are shown in Table 5 below.

TABLE 5

| discharging rate | third increment |
|---|---|
| <=0.3 C | 1 |
| 0.3 C~0.4 C | 2 |
| 0.4 C~0.5 C | 3 |
| 0.5 C~0.6 C | 4 |
| 0.6 C~0.7 C | 5 |
| 0.7 C~0.8 C | 6 |
| 0.8 C~0.9 C | 7 |
| 0.9 C~1.0 C | 8 |
| >=1.0 C | 9 |

When the discharging current is less than or equal to the current of the 0.3 C discharging rate, the processing unit 102 obtains the third increment as 1. When the discharging current is between the current of the 0.3 C~0.4 C discharging rate, the processing unit 102 obtains the third increment as 2. When the discharging current is between the current of the 0.4 C~0.5 C discharging rate, the processing unit 102 obtains the third increment as 3. When the discharging current is between the current of the 0.5 C~0.6 C discharging rate, the processing unit 102 obtains the third increment as 4. When the discharging current is between the current of the 0.6 C~0.7 C discharging rate, the processing unit 102 obtains the third increment as 5. When the discharging current is between the current of the 0.7 C~0.8 C discharging rate, the processing unit 102 obtains the third increment as 6. When the discharging current is between the current of the 0.8 C~0.9 C discharging rate, the processing unit 102 obtains the third increment as 7. When the discharging current is between the current of the 0.9 C~1.0 C discharging rate, the processing unit 102 obtains the third increment as 8. When the discharging current is larger than or equal to the current of the 1.0 C discharging rate, the processing unit 102 obtains the third increment as 9. In other words, the larger the discharging current of the energy storage unit 104 is, the larger the third increment is. In some embodiments, the processing unit 102 measures a voltage across the sensing resistor 110 to calculate the current in the discharging mode. In some embodiments, the processing unit 102 stores the third increment in a discharging current register in the storage unit 108.

In some embodiments, the present disclosure collects the discharging current test data of a plurality of battery devices which are the same as the battery device 100, and stores the discharging current test data in a database. Through a big data analysis, the relationship between the discharging current and the swelling rate of the battery device 100 is obtained. For example, in the present disclosure, after the discharging current test of the plurality of the batter devices which are the same as the battery device 100 is completed, the actual swelling rate of the plurality of the battery devices which are the same as the battery device 100 can be directly measured, correspondingly, and according to the discharging current test data, the actual swelling rate, and quantity of the plurality of the battery devices which are the same as the battery device 100, the specification shown in Table 5 are determined through the big data analysis.

Then, in the discharging mode, the processing unit 102 reads the data of the cycle count in the storage unit 108 again, and obtains the fourth increment corresponding to the cycle count according to Table 3. In the discharging mode, the processing unit 102 reads the temperature from the temperature sensing unit 106, obtains the fifth increment corresponding to the temperature according to Table 4, and stores the fifth increment in the storage unit 108. In some embodiments, the processing unit 102 compares the fourth increment obtained in the charging mode with that obtained in the discharging mode to store the larger fourth increment in the cycle count register in the storage unit 108. In some embodiments, the processing unit 102 compares the fifth increment obtained in the charging mode with that obtained in the discharging mode to store the larger fifth increment in the temperature register in the storage unit 108. In some embodiments, the processing unit 102 measures a voltage across the sensing resistor 110 to detect whether there is a discharging current from the energy storage unit 108. If yes, the processing unit 102 executes operation executed in the discharging mode. If no, the processing unit 1002 enters to the charging mode. In some embodiments, when the relative state-of-charge of the battery device 100 is discharged lower than 3%, the processing unit 102 ends the charging mode, and prepares to enter the discharging mode.

Finally, the processing unit 102 reads the first increment from the internal resistance register in the storage unit 108, the second increment from the charging voltage register in the storage unit 108, the third increment from the discharging current register in the storage unit 108, the fourth increment from the cycle count register in the storage unit 108, and the fifth increment from the temperature register in the storage unit 108. The processing unit 102 multiplies the first, second, third, fourth, and fifth increments to obtain a product value, and determines the swelling rate of the battery device 100 according to the product value. Examples are shown in Table 6 below.

TABLE 6

| product value | swelling rate |
|---|---|
| <=50000 | 1% |
| <=100000 | 2% |
| <=200000 | 3% |
| <=250000 | 4% |
| <=300000 | 5% |
| <=350000 | 6% |
| <=400000 | 7% |
| <=450000 | 8% |
| <=550000 | 9% |
| >550000 | 10% |

When the product value is less than or equal to 50000, the processing unit 102 determines that the swelling rate of the battery device 100 is 1%. When the product value is larger than 50000 but less than 100000, the processing unit 102 determines that the swelling rate of the battery device 100 is 2%. When the product value is larger than 100000 but less than 200000, the processing unit 102 determines that the swelling rate of the battery device 100 is 3%. When the product value is larger than 200000 but less than 250000, the processing unit 102 determines that the swelling rate of the battery device 100 is 4%. When the product value is larger than 250000 but less than 300000, the processing unit 102 determines that the swelling rate of the battery device 100 is 5%. When the product value is larger than 300000 but less than 350000, the processing unit 102 determines that the swelling rate of the battery device 100 is 6%. When the product value is larger than 350000 but less than 400000, the processing unit 102 determines that the swelling rate of the battery device 100 is 7%. When the product value is larger than 400000 but less than 450000, the processing unit 102 determines that the swelling rate of the battery device 100 is 8%. When the product value is larger than 450000 but less than 550000, the processing unit 102 determines that the swelling rate of the battery device 100 is 9%. When the product value is larger than 550000, the processing unit determines that the swelling rate of the battery device 100 is 10%. In some embodiments, the processing unit 102 executes an artificial intelligence algorithm to collect the internal resistance, the charging voltage, the discharging current measured in every charge-discharge cycle, to read the cycle count and the temperature in every charge-discharge cycle, and to adjust the corresponding relationship between class intervals and each increment as described in Tables 1-6.

In some embodiments, when the battery device 100 only operates in the charging mode, the processing unit 102 reads the first, second, fourth, and fifth increments from the storage unit 108, and determines the swelling rate of the battery device 100 according to a first sub-product value of the first, second, fourth, and fifth increments. In some embodiments, when the battery device 100 only operates in the discharging mode, the processing unit 102 reads the third, the fourth, and the fifth increments from the storage unit 108, and determines the swelling rate of the battery device 100 according to a second sub-product value of the third, the fourth, and the fifth increments. In some embodiments, when the processing unit 102 determines that the swelling rate of the battery device 100 reaches 10% according to the product value (or the first sub-product value or the second sub-product value), the processing unit 102 may send an alarm signal to an external processor (for example, a processor of a mobile device where the battery device 100 is located). The external processor provides an image or sound warning to the user through the display of the mobile device according to the alarm signal to remind the user that the life of the battery device 100 is ending. In some embodiments, the processing unit 102 obtains a first product value in a first charge-discharge cycle, and obtains a second product value in a second charge-discharge cycle, and the processing unit 102 compares the first product value with the second product value. When the first product value is larger than the second product value, the processing unit 102 stores the first product value in the storage unit 108. When the second product value is larger than the first product value, the processing unit 102 stores the second product value in the storage unit 108. In other words, the storage unit 108 may always store the maximum product value obtained in each charge-discharge cycle.

Figure 3:
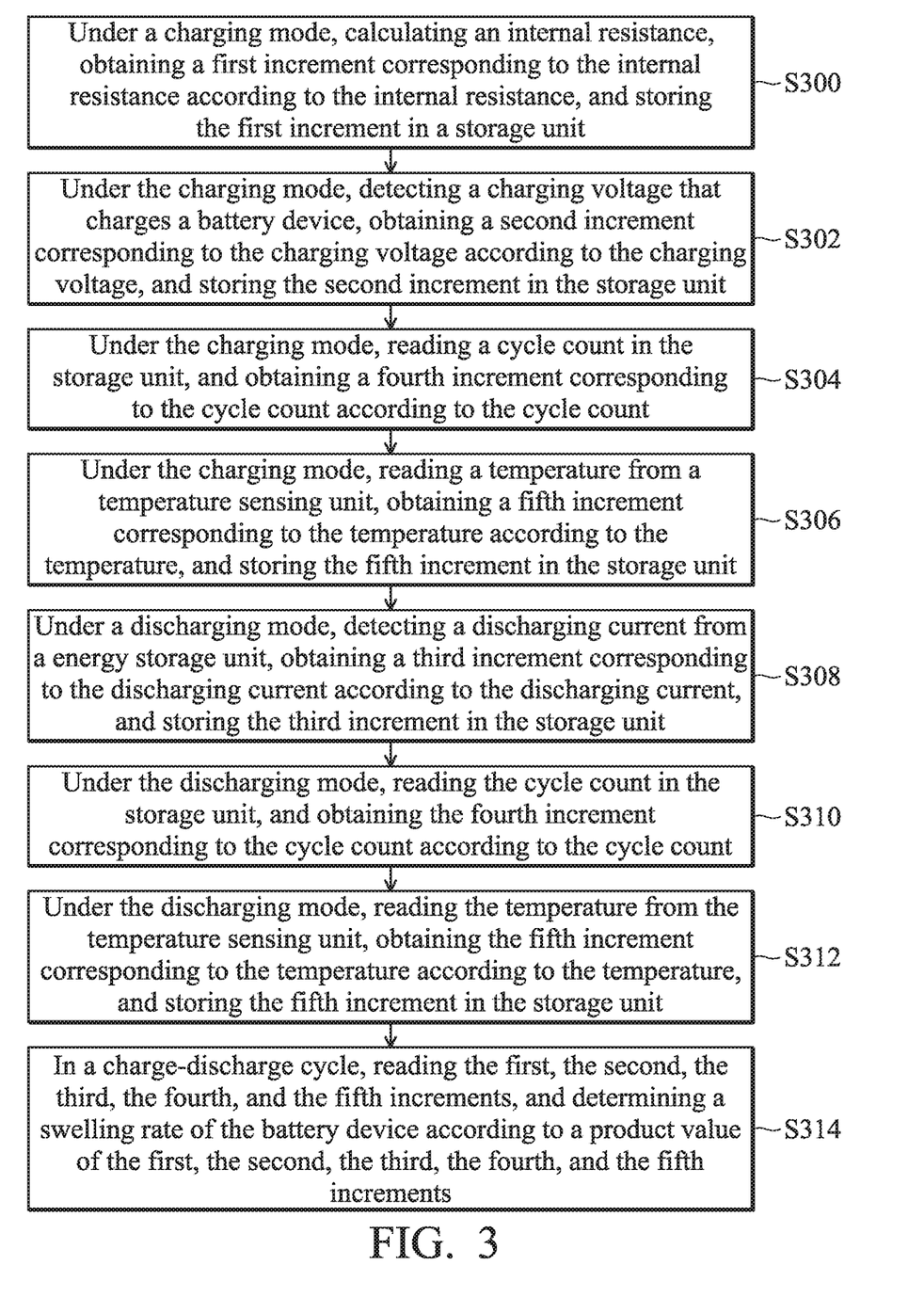
FIG. 3 shows a flow chart of a charge-discharge cycle of the battery device in accordance with some embodiments of the disclosure.

FIG. 3 shows a flow chart of a charge-discharge cycle of the battery device in accordance with some embodiments of the disclosure. As shown in FIG. 3, under a charging mode, the processing unit 102 of the battery device 100 calculates the internal value, obtains a first increment corresponding to the internal resistance according to the internal resistance, and stores the first increment in the storage unit 108 (step S300). Then, processing unit 102 detects a charging voltage that charges the battery device 100, obtains a second increment corresponding to the charging voltage according to the charging voltage, and stores the second increment in the storage unit 108 (step S302). Then, processing unit 102 reads a cycle count in the storage unit 108, and obtains a fourth increment corresponding to the cycle count according to the cycle count. Then, processing unit 102 reads a temperature from the temperature sensing unit 106, obtains a fifth increment corresponding to the temperature according to the temperature, and stores the fifth increment in the storage unit 108 (step S306). After that, in the discharging mode, the processing unit 102 detects a discharging current from the energy storage unit 108, obtains a third increment corresponding to the discharging current according to the discharging current, and stores the third increment in the storage unit 108 (step S308). Then, the processing unit 102 reads the cycle count in the storage unit 108, and obtains the fourth increment corresponding to the cycle count according to the cycle count (step S310). The processing unit 102 reads the temperature from the temperature sensing unit 106, obtains the fifth increment corresponding to the temperature according to the temperature, and stores the fifth increment in the storage unit 108 (step S312). In a charge-discharge cycle, the processing unit 102 reads the first, second, third, fourth, and fifth increments, and determines the swelling rate of the battery device 100 according to a product value of the first, second, third, fourth, and fifth increments (step S314).

In some embodiments, the processing unit 102 of the battery device 100 in FIG. 1 executes the steps S300~S314. In some embodiments, the processing unit 102 compares the fourth increment obtained in the step S304 with that obtained in the step S310 to store the larger fourth increment in the cycle count register in the storage unit 108. In some embodiments, the processing unit 102 compares the fifth increment obtained in the step S306 with that obtained in the discharging mode to store the larger fifth increment in the temperature register in the storage unit 108. The other detailed steps executed by the processing unit 102 of the battery device 100 in FIG. 1 disclosed in the present disclosure are described in the previous paragraphs, so they will not be repeated herein.

The ordinals in the specification and the claims of the present invention, such as "first", "second", "third", etc., have no sequential relationship, and are just for distinguishing between two different components with the same name. In the specification of the present invention, the word "couple" refers to any kind of direct or indirect electronic connection. The present invention is disclosed in the preferred embodiments as described above, however, the breadth and scope of the present invention should not be limited by any of the embodiments described above. Persons skilled in the art can make small changes and retouches without departing from the spirit and scope of the invention. The scope of the invention should be defined in accordance with the following claims and their equivalents.

What is claimed is:

1. A battery device, comprising:
an energy storage unit, storing electrical energy;
a temperature sensing unit, detecting a temperature of the battery device;
a storage unit, storing a cycle count of the battery device;
a processing unit, coupled to the energy storage unit, the temperature sensing unit and the storage unit;
wherein when the battery device is in a charging mode, the processing unit at least executes:
calculating an internal resistance of the energy storage unit, obtaining a first increment corresponding to the internal resistance according to the internal resistance, and storing the first increment in the storage unit;
detecting a charging voltage that charges the battery device, obtaining a second increment corresponding to the charging voltage according to the charging voltage, and storing the second increment in the storage unit;
wherein when the battery device is in a discharging mode, the processing unit at least executes:
detecting a discharging current of the energy storage unit, obtaining a third increment corresponding to the discharging current according to the discharging current, and storing the third data in the storage unit;

wherein in the charging mode and the discharging mode, the processing unit further executes:
reading the cycle count of the battery device, and obtaining a fourth increment corresponding to the cycle count according to the cycle count
reading the temperature from the temperature sensing unit, obtaining a fifth increment corresponding to the temperature according to the temperature, and storing the fifth increment in the storage unit;
wherein in a charge-discharge cycle, the processing unit reads the first, second, third, fourth, and fifth increments from the storage unit, and determines a swelling rate of the battery device according to the first, second, third, fourth, and fifth increments.

2. The battery device as claimed in claim 1, wherein in the charging mode, the processing unit reads the first, second, fourth, and fifth increments from the storage unit, and determines the swelling rate of the battery device according to a first sub-product value of the first, second, fourth and fifth increments.

3. The battery device as claimed in claim 1, wherein in the discharging mode, the processing unit reads the third, the fourth, and the fifth increments from the storage unit, and determines the swelling rate of the battery device according to a second sub-product value of the third, the fourth and the fifth increments.

4. The battery device as claimed in claim 1, further comprising a sensing resistor coupled between the energy storage unit and the processing unit; wherein the processing unit calculates a charging current in the charging mode or calculates the discharging current in the discharging mode by measuring the voltage across the sensing resistor.

5. The battery device as claimed in claim 4, wherein the processing unit calculates the internal resistance of the energy storage unit, comprising:
measuring a first voltage of the energy storage unit at a first time point;
measuring a second voltage of the energy storage unit at a second time point;
calculating the internal resistance of the energy storage unit according to a voltage difference between the first voltage and the second voltage and the charging current in the charging mode.

6. The battery device as claimed in claim 1, wherein the higher the internal resistance of the energy storage unit is, the larger the first increment is; the higher the charging voltage that charges the battery device is, the larger the second increment is; the larger the discharging current of the battery device is, the larger the third increment is; the more the cycle count of the battery device is, the larger the fourth increment is; and the higher the temperature of the battery device is, the larger the fifth increment is.

7. The battery device as claimed in claim 1, wherein when the battery device is in the charging mode, the processing unit executes the following tasks:
detecting whether the battery device is coupled to an external power; if yes, executing operations what the processing unit does in claim 1 in the charging mode; if not, entering into the discharging mode.

8. The battery device as claimed in claim 1, wherein in the discharging mode, the processing unit further executes the following tasks:
detecting whether there is a discharging current from the energy storage unit; if yes, executing operations what the processing unit does in claim 1 in the discharging mode; if not, entering into the charging mode.

9. The battery device as claimed in claim 1, wherein the processing unit further executes the following tasks:
obtaining a first product value in a first charge-discharge cycle;
obtaining a second product value in a second charge-discharge cycle;
storing the first product value in the storage unit when the first product value is larger than the second product value;
storing the second product value in the storage unit when the second product value is larger than the first product value.

10. The battery device as claimed in claim 1, wherein the processing unit executes the following tasks:
ending the charging mode when a relative state-of-charge of the battery device is 100%; and
ending the discharging mode when the relative state-of-charge of the battery device is lower than 3%.

* * * * *